United States Patent
Stacey et al.

(10) Patent No.: US 9,946,729 B1
(45) Date of Patent: Apr. 17, 2018

(54) SPARSE RECALL AND WRITES FOR ARCHIVED AND TRANSFORMED DATA OBJECTS

(75) Inventors: Christopher H. E. Stacey, Christchurch (NZ); Jerald W. Gross, Edison, NJ (US); Ravi Venkata Batchu, Monmouth Junction, NJ (US); Christian J. Chuba, Berkeley Heights, NJ (US); Walter Forrester, Berkeley Heights, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 850 days.

(21) Appl. No.: 12/262,316

(22) Filed: Oct. 31, 2008

Related U.S. Application Data

(63) Continuation-in-part of application No. 11/085,898, filed on Mar. 21, 2005, now Pat. No. 8,055,724.

(51) Int. Cl.
*G06F 17/30* (2006.01)

(52) U.S. Cl.
CPC .............................. *G06F 17/30221* (2013.01)

(58) Field of Classification Search
None
See application file for complete search history.

(56) References Cited

U.S. PATENT DOCUMENTS

| | | | |
|---|---|---|---|
| 6,091,835 A * | 7/2000 | Smithies et al. | 382/115 |
| 6,385,626 B1 * | 5/2002 | Tamer et al. | |
| 6,654,851 B1 * | 11/2003 | McKean | 711/112 |
| 7,392,291 B2 * | 6/2008 | Jewett et al. | 709/214 |
| 7,460,672 B2 * | 12/2008 | Klein | 380/278 |
| 7,508,609 B2 * | 3/2009 | Boyton et al. | 360/48 |
| 2005/0080823 A1 * | 4/2005 | Collins | 707/200 |
| 2006/0212746 A1 * | 9/2006 | Amegadzie | G06F 17/30221 714/6.3 |
| 2007/0179990 A1 * | 8/2007 | Zimran | G06F 17/30085 |
| 2008/0154993 A1 * | 6/2008 | Rathi | G06F 3/048 |
| 2008/0270436 A1 * | 10/2008 | Fineberg | G06F 17/30097 |

\* cited by examiner

*Primary Examiner* — Tyler Torgrimson

(57) ABSTRACT

This invention is a system and a method for operating a storage server in a data network using a new architecture. The system of operating a storage server includes a secondary storage that archives or stores a data object in transformed form such that the clients of the storage server can no longer access the data directly. The method of accessing the data object that is archived or transformed in a different form to the secondary storage includes recalling only those data blocks that are required for read or write operation.

20 Claims, 12 Drawing Sheets

CREATION OF AN OFFLINE INODE FOR SPARSE RECALL

SPARSE RECALL AND WRITES FOR ARCHIVED AND TRANSFORMED DATA OBJECTS

CROSS REFERENCE TO RELATED APPLICATION

This Application is Continuation-in-Part Application of U.S. patent application Ser. No. 11/085,898 filed on Mar. 21, 2005, now U.S. Pat. No. 8,055,724 issued on Nov. 8, 2011, entitled "SELECTION OF MIGRATION METHODS INCLUDING PARTIAL READ RESTORE IN DISTRIBUTED STORAGE MANAGEMENT."

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to accessing data in a distributed data storage environment, and more particularly to a system and a method for reading and writing data from archived, compressed, encrypted or otherwise transformed data storage objects such as files or LUNs in such a data storage environment.

BACKGROUND OF THE INVENTION

Network data storage is typically provided by an array of disk drives integrated with large semiconductor cache memory. A file server is used to interface the cached disk array to the network. The file server performs mapping of a network files to logical block addresses of storage in the cached disk array and move data between a network clients and the storage in the cached disk array. The file server use a network block services protocol in a configuration process in order to export to the network client logical volumes of the network-attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference. Network clients typically use a network file system access protocol to access one or more file systems maintained by the file server.

Data network technology permits multiple users to share economically access to files in a number of file servers. Files are also often moved between file servers in order to relocate infrequently accessed files from feature-rich, expensive, and highly-protected high-speed disk storage to more economical and possibly slower mass storage. In such a system, the high-speed disk storage is referred to as primary storage, and the mass storage is referred to as secondary storage. When a client needs read-write access to a file in the secondary storage, the file typically is moved back to the primary storage, and then accessed in the primary storage. This kind of migration of files between levels of storage in response to client requests based on file attributes such as the time of last file access and last file modification is known generally as policy-based file migration.

In a data processing network employing policy-based file migration, a client typically accesses a primary file server containing the primary storage, and the secondary storage is often in another file server, referred to as a secondary file server. When a file is moved from a primary file server to a secondary file server, the file in the primary file server is typically replaced with a stub file that contains attributes of the file and a link to the new file location in the secondary file server. The stub files can be accessed to read data from the secondary storage in response to client read and write requests.

When a file on a primary storage is replaced by a stub file, the data contained in the file can be archived to secondary storage in the original form or it can be transformed in a different form that is not directly accessible to the clients of the file server. Compression and encryption are two such examples of data transformations that are possible.

In one example, File level Redundant Data Elimination (F-RDE) permits file server to increase file storage efficiency by eliminating redundant data from the files stored in the file system. It provides file server the ability to process files in order to compress them and only share the same instance of the data if they happen to be identical on a per file system basis. The process of eliminating duplicate copies of the same file data and employing compression on all data that gets transferred to the F-RDE Store is called space reduction and files transferred to RDE store in that form are called space reduced files. Encryption is another way in which the data associated with a file can be transformed such that it is stored in a form that the client cannot use directly.

When a client of a file server attempts to read the archived or transformed file, the file server recalls the requested file data from secondary storage according to various policy supported by the policy-based file migration. Under one such partial recall policy, when a read request from a client is for a block of data in the middle of the file, the file server recalls complete data contained in the file from the beginning of the file to the offset in the file that is requested by the client. When a write request comes from the client for an archived file or a transformed file, file server reads the entire file back to the primary file system before allowing the write request to complete.

Access to archived files or transformed files in a manner described above is considerably slower than access to files from a primary storage. As a result reading data from secondary storage or from a transformed file suffers from high latency. Additionally writing data to archived file or transformed file causes unnecessary space consumption because entire file data is recalled to primary storage before the write operation can complete.

The storage technology described above, in combination with a continuing increase in disk drive storage density, file server processing power and network bandwidth at decreasing cost, has provided network clients with more than an adequate supply of network storage capacity at affordable prices. Reducing the time it takes to read data from the file or write data to the file and reducing the space required to write data to file would be advancement in the data storage computer-related arts. This is becoming increasingly important as the amount of information being handled and stored grows geometrically over short time periods and such environments add more file systems and data at a rapid pace.

SUMMARY OF THE INVENTION

To overcome the problems described above and to provide the advantages also described above, the present invention in one embodiment includes a system for accessing a data object by a client of a storage server in a data network consisting of a secondary storage and a storage server. The secondary storage is used to archive the data object or store the data in different form such that the client of the storage server can no longer access the data directly. The storage server presents a logical view of the data object that is archived or transformed into a different form to the secondary storage. In response to a request by the client of the storage server to access the data object, storage server checks whether the data object has been archived or transformed in a different form to a secondary storage and upon finding that the data object has been archived or transformed in a different form to the secondary storage, recalls only those data blocks that are required to satisfy the client request.

In another embodiment method steps are carried out for accessing a data object by a client of a storage server in a data network consisting of a secondary storage and a storage server. The method in response to a request by a client of the storage server to access a data object, checks whether the data object has been archived or transformed into a different form to a secondary storage. The storage server presents a logical view of the data object that is archived or transformed into a different form to the secondary storage such that the client of the storage server can no longer access the data directly. The method upon finding that the data object has been archived or transformed into a different form to the secondary storage, recalls only those data blocks that are required to satisfy the client request, wherein the data block is a portion of the data object that is handled as one unit while accessing the data object.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in a data storage environment that include data storage systems, such as the Symmetrix Integrated Cache Disk Array system or the Clariion Disk Array system available from EMC Corporation of Hopkinton, Mass. and those provided by vendors other than EMC, and a file server such as Celerra File Server, which is available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The embodiment of the present invention reduces the data that needs to be recalled to satisfy the request of a client of a file server for writing data to a file that is either archived to a secondary storage or transformed in a form that is not directly accessible by that client. The present invention also reduces the amount of data that needs to be recalled to satisfy the request of a client of a file server for reading data from a file archived to a secondary storage or transformed in a form that is not directly accessible by that client. In response to a read request by a client for an archived file, the file server recalls only the data blocks required to satisfy the client read request. Further, in response to a client request to modify an archived or transformed file, the file server allows write operation to proceed by recalling and modifying only the affected data instead of recalling the complete file.

The new architecture also allows for quick access to a file that is either archived or transformed by recalling only the necessary data block required to satisfy the request by a client. By doing the sparse recall, the present invention further exploits the benefit of de-duplication. Advantages provided include: (1) reduction of overall I/O requirements of a system; (2) low latency in accessing the file data; and (3) space efficiency and economical use of storage resources.

Architecture

Figure 1:
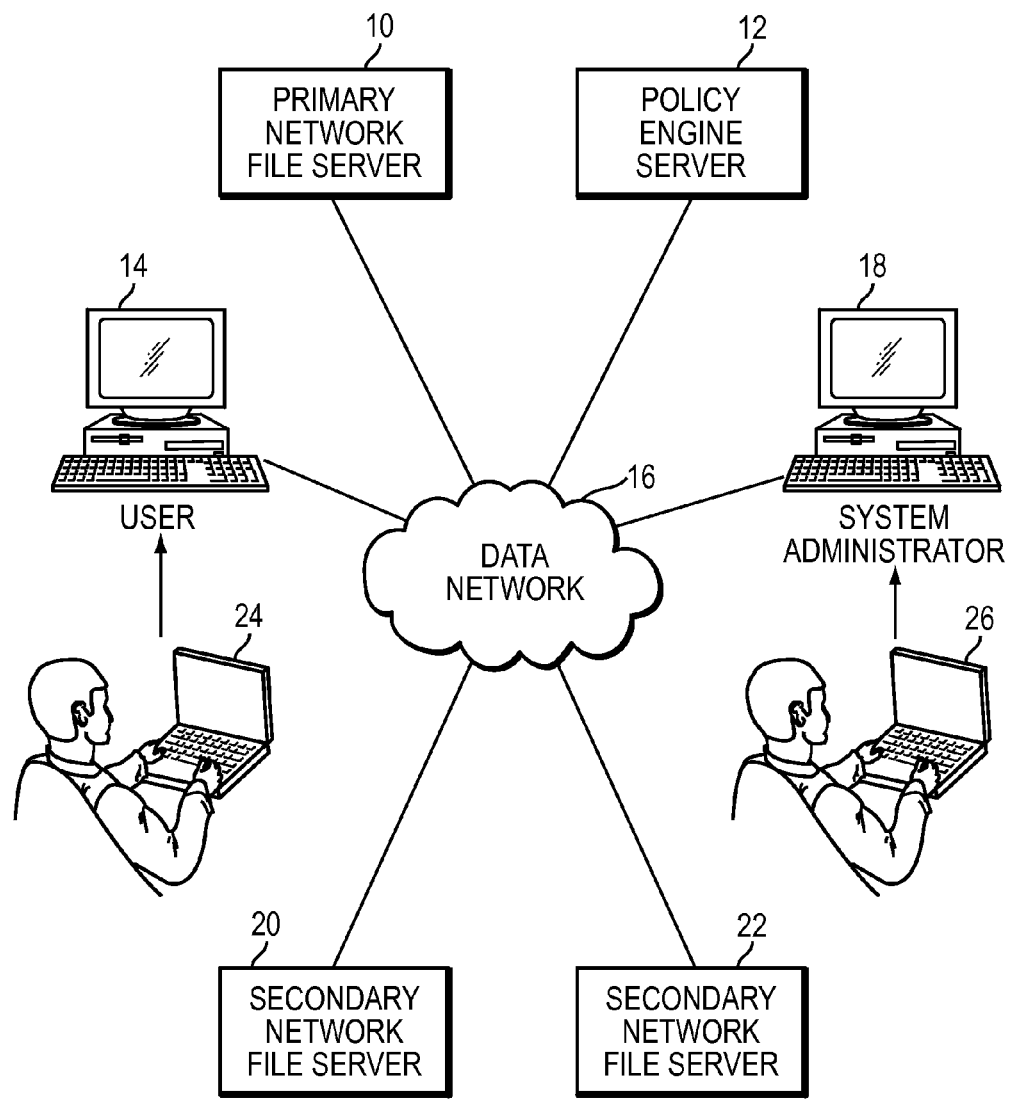
FIG. 1 is a block diagram of a data network including file servers for serving client workstations operated by respective users, and a policy engine server for initiating migration of file data from a primary file server to one or more secondary file server.

Referring now to FIG. 1, reference is now made to a data processing system including a data network 16 interconnecting a number of clients and servers. The data network 16 may include any one or more of network connection technologies, such as Ethernet or Fibre Channel, and communication protocols, such as TCP/IP or UDP. The clients include work stations 14 and 18. The work stations, for example, are personal computers operated by human users 24, 26. The servers include a primary network file server 10, secondary network file servers 20 and 22, and a policy engine server 12.

The primary network file server 10, for example, is a cached disk array as described in Vahalia et al., U.S. Pat. No. 5,893,140 issued Apr. 6, 1999, incorporated herein by reference. Such a cached disk array 10 is manufactured and sold by EMC Corporation, 176 South Street, Hopkinton, Mass. 01748. The secondary network file serves 20 and 22, for example, are similar to the primary network file server 10 except that they have a relatively small amount of cache memory, and a relatively large array of relatively slow, high-capacity disk drives, such as ATA disk drives.

The primary network file server 10 is programmed to respond to a command for migrating the data of a specified file from the primary file server to a specified secondary network file server while retaining metadata for the file in the primary file server. The metadata for the file includes the typical file attributes and also additional offline attributes including a complete network pathname to the specified secondary file server and the file data in the specified secondary file server. Once the file data has been migrated, the file is said to be "offline." The primary file server is also programmed to access the file data of offline files in various ways in response to client requests for read or write access to the offline files.

The data processing system in FIG. 1 includes a policy engine server 12 that decides when a file in the primary network file server should become offline. The policy engine server 12 is activated at scheduled times, or it may respond to events generated by specific file type, size, owner, or a need for free storage capacity in the primary network file server. Migration may be triggered by these events, or by any other logic. When free storage capacity is needed in the primary network file server, the policy engine server 12 scans file attributes in the primary file server in order to identify online files and to select an online file to become offline. The policy engine server 12 may then select a secondary network file server to become the secondary storage for the data of the selected online file, and send a migration command to the primary network file server specifying the selected online file and the selected secondary network file server. Once data of a file has been migrated to secondary storage and the offline attributes of the file have been set to indicate that the file is offline, the policy engine server can be shut down without affecting in any way the recall of the file data from secondary storage. It is also possible to pre-schedule a recall of specific files or directories. This can be done in preparation for a predicted need for this information.

Figure 2:
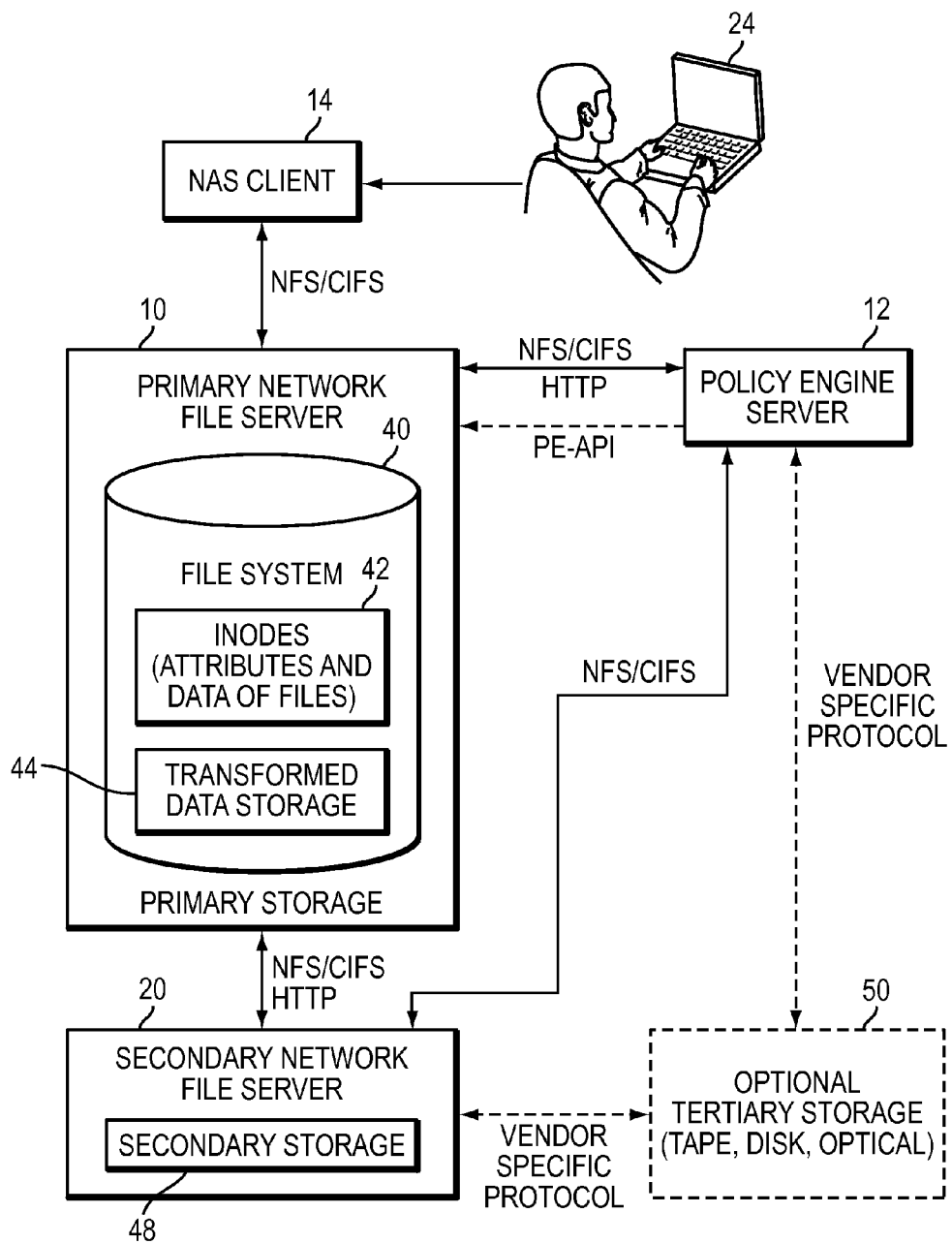
FIG. 2 is a block diagram showing a data and control flow between the clients and servers in the data network of FIG. 1 including a new architecture embodying the present invention and which is useful in such an environment.

FIG. 2 shows the preferred flow of data and control between the clients and servers in the data network of FIG. 1. The network attached storage (NAS) client 14 use the network file system (NFS) or common internet file system (CIFS) protocols for access the primary network file server 10. The system administrator 24 of NAS client 14 uses the TCP/IP protocol for setting policy rules in the policy engine 12. The policy engine server 12 uses NFS, CIFS or HTTP for accessing attributes of files in the primary network file server 10 and in the secondary network file server 20. The policy engine server 12 sends a policy engine application interface (PE-API) command to the primary network file server 10 in order to initiate migration from the primary network file server 10 to the secondary network file server 20.

The primary network file server 10 and the secondary network file server 20 use the NFS, CIFS, or other data transfer protocols (HTTP, P, etc.) for migrating data belonging to file system 40 from the primary network file server to the secondary storage 48 on the secondary network file server 20 and for the recall of data from the secondary network file server to the primary network file server. In order to recall file data from the secondary file server to the primary file server, a NFS, CIFS, HTTP or HTTPS connection is set up between the primary file server and the secondary network file server.

As further shown in FIG. 2, the data network may include optional tertiary storage 50 such as tape, disk, or optical storage. Such tertiary storage would use proprietary vendor specific protocols for transfer of data between the secondary network file server 20 and the tertiary storage, and for access of the policy engine server to the tertiary storage.

In a preferred implementation, primary network file server 10 may also include Transformed Data Storage 44 such as Redundant Data Elimination (RDE) storage that gives the file server the ability to process files in order to compress them and only share the same instance of the data if they happen to be identical on a per file system basis. For example, if there are 70 copies of a power point presentation on a file system then there will still be 70 files but they will all share the same file data. In this example the space usage will decrease by a factor of almost 70. File level RDE will also employ compression as well as file level de-duplication. For example, if there are 50 unique files in the same file system then there will still be 50 unique files but the data will be compressed yielding a space savings of up to 50%. In the previous example the 70 files would all share one instance of the file data and that instance of the data will be compressed on disk. That one instance of the file data could be encrypted as well. Also, that instance of the file data could be both compressed and encrypted.

In a preferred implementation, a file migration service is used to copy a specified file from the primary network file server 10 to a new corresponding file on a secondary network file server. File migration service is also used to copy a specified file from the primary network file server 10 to a new corresponding file on Transformed data storage 44. The file copied to Transformed data storage is transformed by using the techniques of compression or encryption. The Transformed data store is responsible for compressing and de-duplicating the data within its domain. Then the online Inode 42 of the specified file in the primary network file server is converted to an offline Inode representing the stub file in the primary network file server. The offline Inode specifies a full absolute network pathname to the corresponding file in the secondary storage. Then all of the data blocks for the file in the primary network file server are freed. File migration service is then responsible for retrieving the data on read access so that the NAS clients are unaware that the data has been relocated. The resulting stub file on the user portion of the visible name space looks online to the user and is called a de-duplicated or F-RDE stub file. The F-RDE store is hidden under slash etc and is not visible to NAS clients. The F-RDE store is on the same file system as the original data. This simplifies replication/failover scenarios. The F-RDE store compresses data on the way in and decompresses it on the way out. The client will only ever see decompressed data.

Figure 3:
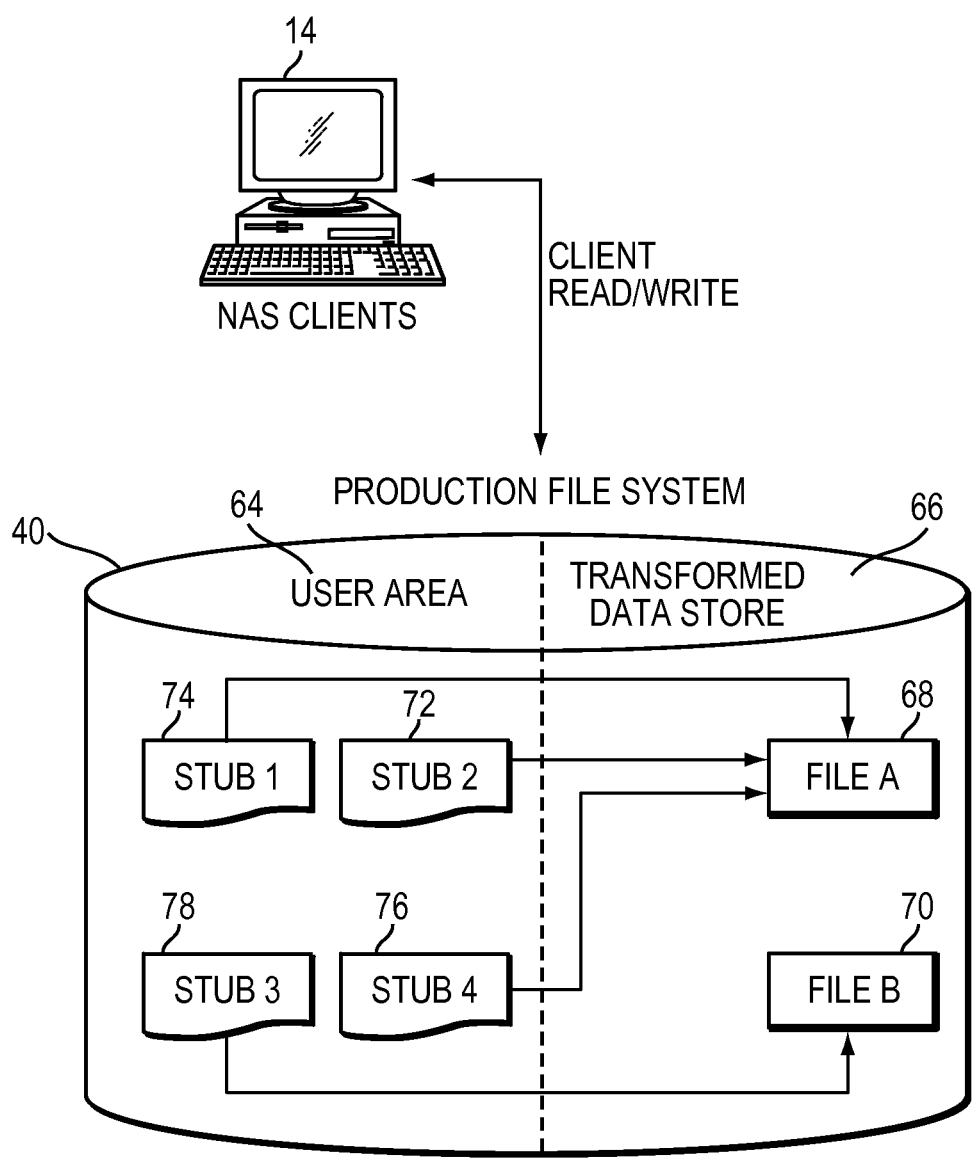
FIG. 3 is a block diagram showing one or more transformed files and an internal Transformed data storage that process the read and write request from a client.

FIG. 3 shows files belonging to production file system 40 that are archived to Transformed data store 66 in a transformed form. NAS clients 14 issuing the read or write request is unaware that the data has been relocated. When File A 68 is relocated to hidden Transformed data store, a stub file 74 is created that seems online to the NAS client 14 issuing read or write request. If there is another copy of the File A 68 in the user area 64 portion of the production file system 40, that copy of the file is also converted to a stub file 72 pointing to the relocated File A 68. Similarly a third copy of the file is also converted to a stub file 76 pointing to the relocated File A 68. Also, File B 70 when relocated to Transformed data store is replaced by a stub file 78 in a user visible area of the production file system.

Figure 4:
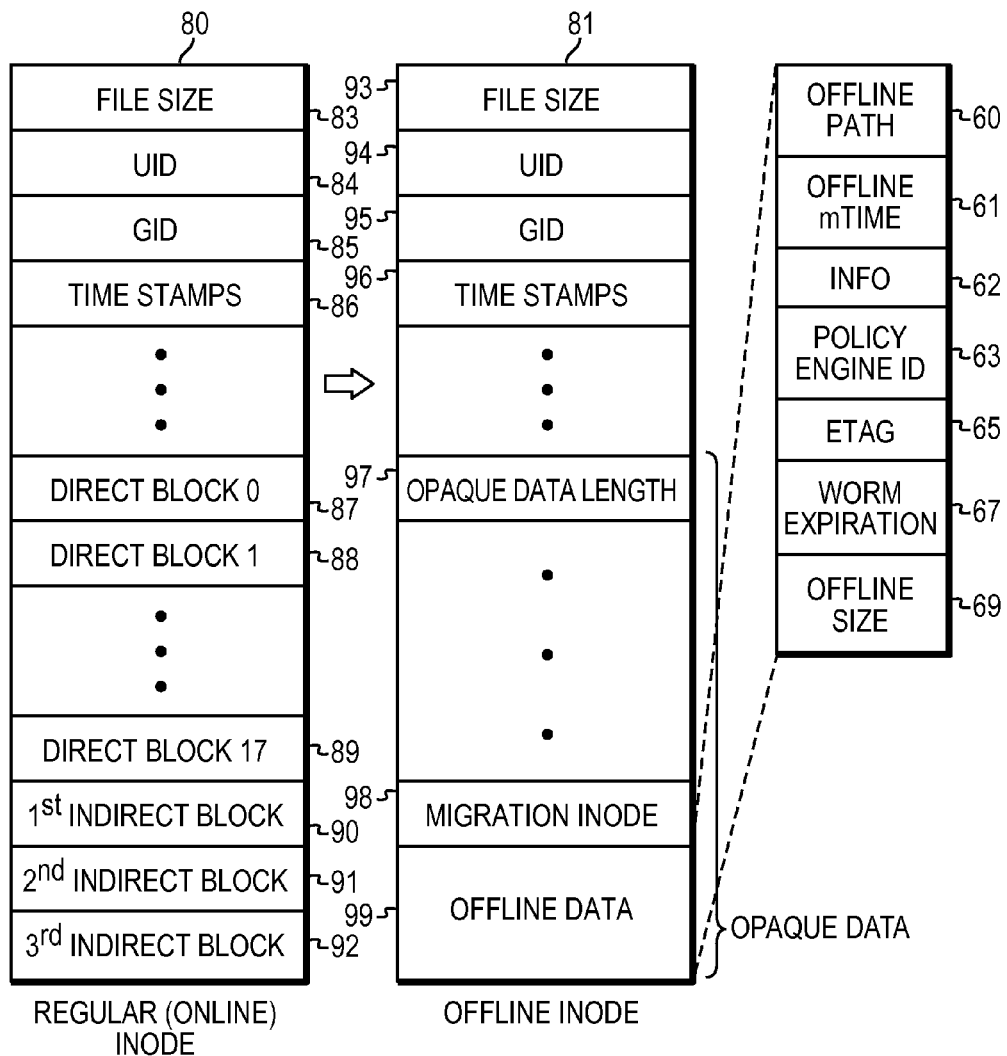
FIG. 4 is a block diagram showing layout of an online and an offline inode during sparse recall of a file from secondary storage.

FIG. 4 shows the conversion of a file into a stub file that involves converting a regular inode 80 of a file into an offline inode 81 as shown in the figure. De-duplicated files are implemented as stubs pointing to the entity actually containing the data. These are created on production file system when the corresponding file is relocated or archived. The location of the entity containing the file data is stored in the offline path 60 in the offline data 99. The offline data is part of the opaque data. The opaque data occupies the same area of a regular inode which is used to store the direct and indirect block addresses 87-92. In the case of Transformed data storage the offline path stores the necessary information to find the entity in the Transformed Data store. In the case of archived data, the offline path stores the information identifying the secondary server containing an archive and the path to the file in the archive. A new attribute containing the size of the offline file 69 (i.e., the file in the Transformed Data store) is also stored in the offline data. The offline data 99 includes few other attributes like offline mtime 61, info 62, policy engine id 63, etag 65 and worm expiration 67 to store various attributes of offline data being archived or transformed. The offline size attribute 69 is the key in determining whether an existing stub was created by a kernel which did not have the sparse recall support. This is utilized during upgrading to the new kernel with the sparse recall support from an old kernel without the sparse recall support. Regular online includes some other fields like file size 83, UID 84, GID 85 and timestamps 86 to store various file system attributes. Similarly offline inode includes fields like file size 93, UM 94, GID 95, timestamps 96, opaque data length 97 and migration inode 98 to store various file system attributes.

Figure 5:
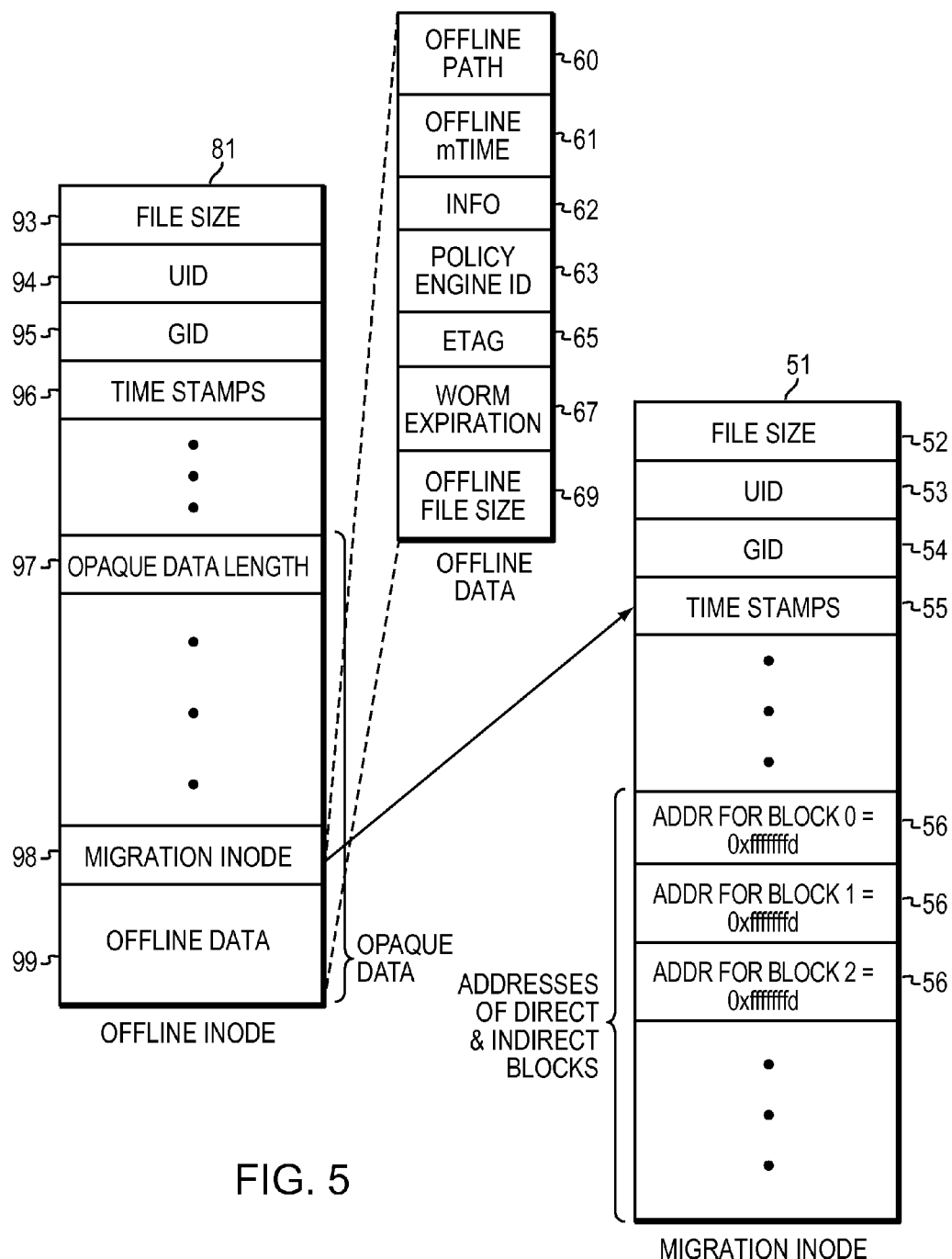
FIG. 5 is a block diagram showing layout of an offline and a migration inode during sparse recall of a file from secondary storage.

FIG. 5 shows the layout of an offline inode 81 and its corresponding migration inode 98 during sparse recall of archived or transformed data. During the first write to a stub, a migration inode 51 is created. The new migration inode is initialized to indicate that all its blocks are offline and its size is set to the size of the file. The fact that a block is offline would be represented by storing a special value in the fields in the inode for direct and indirect blocks 56-58, indicating that the corresponding blocks should be fetched from the file on the secondary store specified in the offline inode. The presence of a special value like 0xffffffffd in any of the fields meant for block addresses can be concluded to convey the fact that the corresponding block is offline and not located in the local file system block. After creating the migration inode, the data associated with the write operation would be written to the migration inode. A read from a client checks whether the block that is required to be read is already available locally in the migration inode 98. If the block is available in the migration inode, data is fetched from the migration inode block. On the other hand if the block requested is offline, then the block will be fetched from the archive or Transformed data store and provided to the client. Migration inode includes some other fields like file size 52, UID 53, GID 54 and timestamps 55 to store various file system attributes.

When a client requests the primary file server for read access to a file, the read operation is satisfied by reading the file data from the primary file server if the inode is online. Otherwise, a particular one of a number of predefined methods for read access to an offline file is selected for accessing the file data from the secondary file server that stores the file data for the file. The predefined methods for read access to an offline file include a full read migration, a partial read migration, and a pass-through read of the file data. Under prior art, in a partial read migration, the client requests a read of specific file data. The primary file server responds by partial migration of file system data blocks including at least the specific file data. The file server may also migrate a certain number of additional file system data blocks following the last file system data block containing the specific file data.

Figure 6:
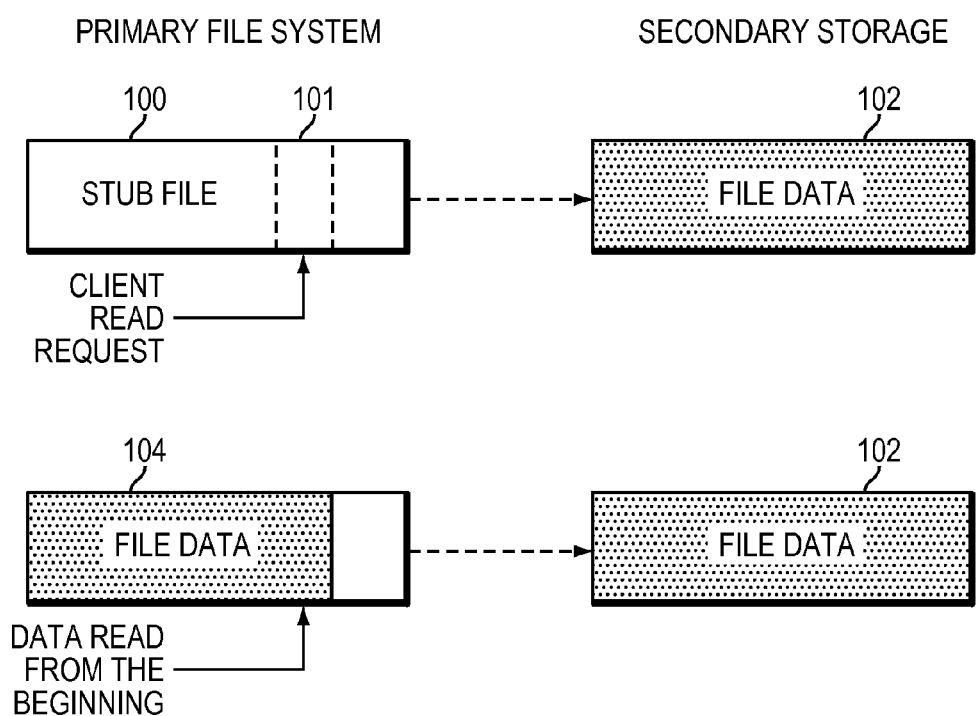
FIG. 6 is a block diagram showing a partial recall of a data from an archived file for a read operation according to the prior art.

FIG. 6 shows the block diagram of a partial read migration operation performed under the prior art. File data 102 is archived to secondary storage where original file is converted into a stub file 100 on primary file server. When client sends a read request for a block 101 somewhere in the middle of the file, file server reads data 104 from the beginning of the file up to and including the block 101 requested by the client. If all of the file system data blocks of the file happen to be migrated, the offline file can be made online. Otherwise, the migration Inode becomes substituted for the offline Inode. The offline attributes, however, indicate that the primary file server stores a partially migrated file. The client is given read access to the file when the requested file data is recalled and it could take a long time if block requested by client is towards the end of a large file. The present invention implements the sparse recall where only the block requested by the client is migrated instead of file data from the start of the file. This advantage is particularly important for large files, thus making response time to a client or application much quicker.

Figure 7:
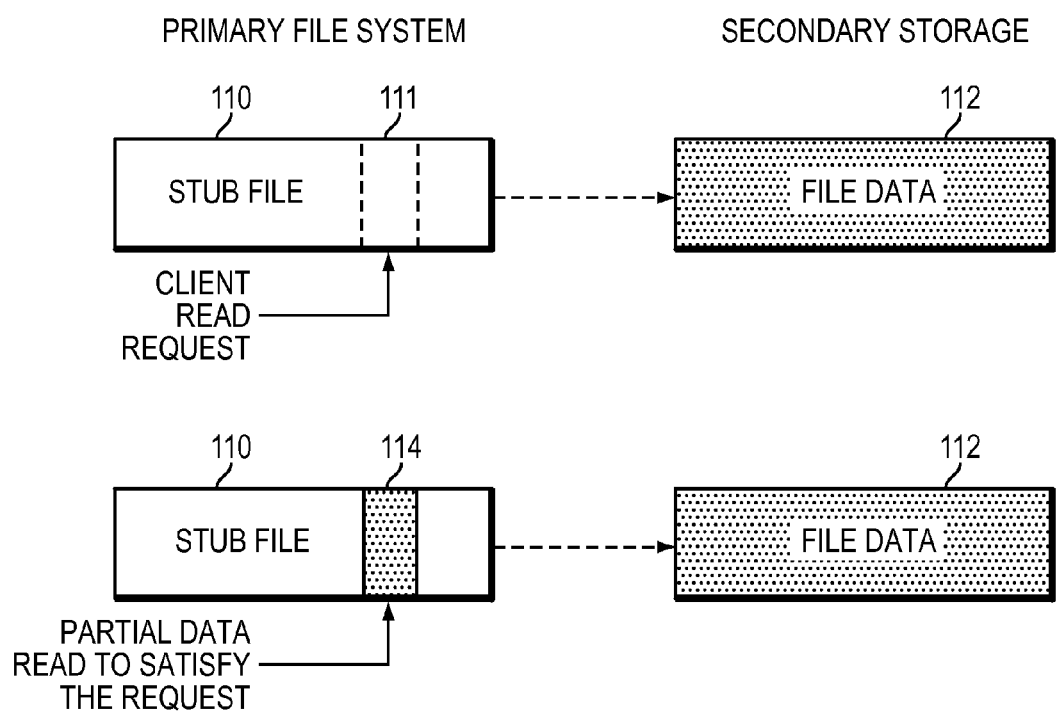
FIG. 7 is a block diagram showing a sparse recall of a data from an archived file for a read operation according to the present invention.

FIG. 7 shows the block diagram of sparse recall of present invention during a read operation requested by client of the file server. File data 112 is archived to secondary storage where original file is converted into a stub file 110 on primary file server. When client sends a read request for a block 111 somewhere in the middle of the file, file server reads only that data block 114 requested by the client.

When a client requests the primary file server for write access to a file, the write operation will fail if there is not enough free space for the file system on the primary file server or if the file system is read-only. If the file's Inode is already online, writes proceed as usual. If file's inode is offline, then under the prior art, the file is brought online by a full migration of the file data from the secondary file server storing the data of the file to the primary file server.

Figure 8:
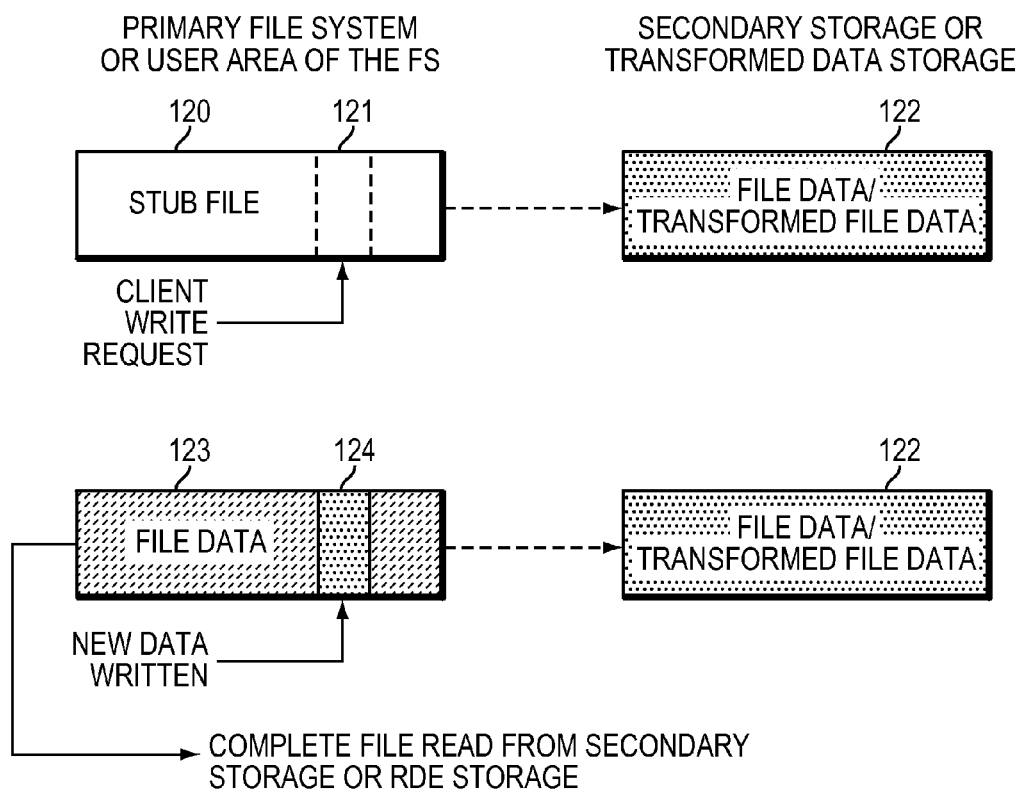
FIG. 8 is a block diagram showing a full recall of a data from a secondary or Transformed data storage on write operation according to the prior art.

FIG. 8 shows the block diagram of a full recall operation performed according to the prior art when client sends a write request to the file server. File data 122 is archived to secondary storage or relocated to Transformed data storage in a compressed form. Original file on primary file server is converted into a stub file 120. When client sends a write operation for a block 121 somewhere in the middle of the file, file server recalls the entire file 123 back to the user area of the file system before allowing the write request for new data 124 to proceed. This operation can take a long time if the file size is large and also requires the space on the primary file server to migrate or relocate the complete file from the secondary or Transformed data storage.

The present invention implements the sparse write functionality where only the block modified by the client is recalled and modified instead of recalling the entire file data before modifying the data block. This advantage is particularly important for large files, thus making response time to a client or application much quicker. It also saves space on the primary file server storage as full content of the file does not need to be migrated.

Figure 9:
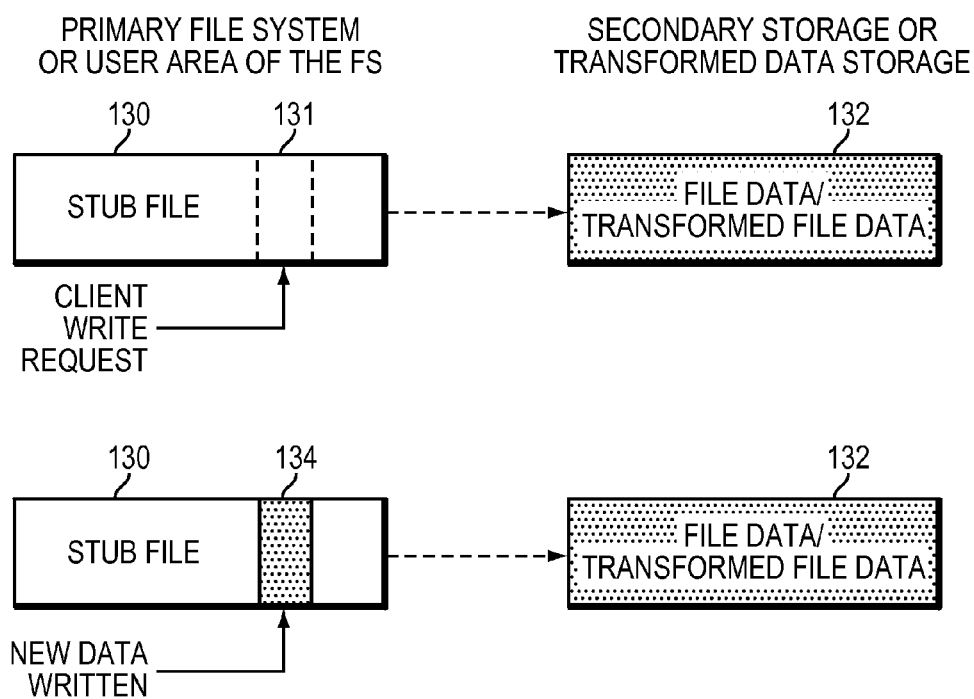
FIG. 9 is a block diagram showing a sparse recall on write of a data from a secondary or Transformed data storage according to the present invention.

FIG. 9 shows the block diagram of a sparse recall operation performed according to the present invention when client sends a write request to the file server. File data 132 is transformed to Transformed data storage or archived to secondary storage. Original file is converted into a stub file 130 on a primary file server. When client sends a write request for a block 131 somewhere in the middle of the file, file server allows write of new data 134 into user area of the file system and does not recall the content of the file 132 from the secondary or Transformed data storage. This may require reading some additional data from the secondary storage or Transformed data storage first if new data 134 being modified by the client does not occupy whole blocks.

Further Operation Details

Figure 10:
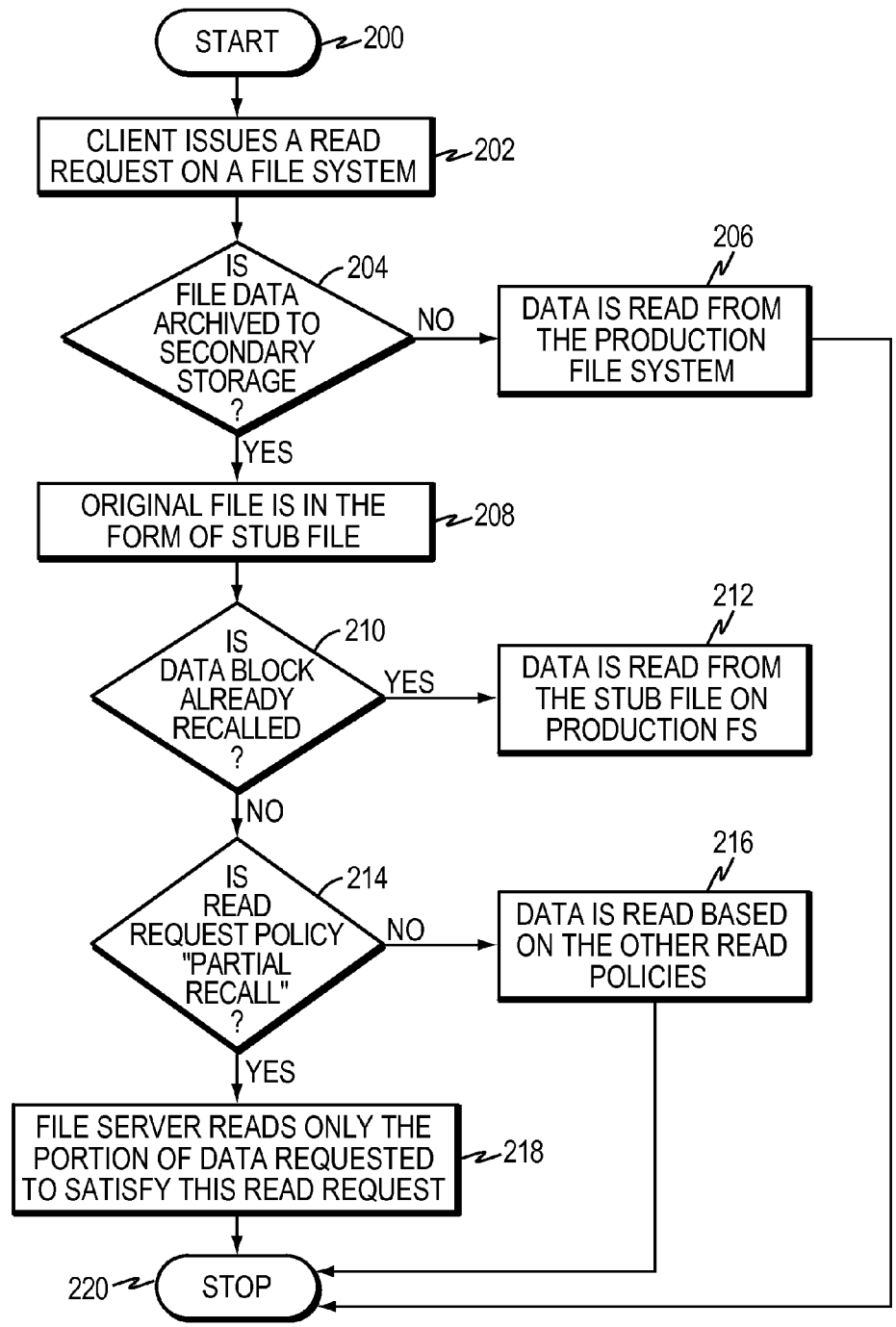
FIG. 10 is a flow logic diagrams illustrating a method of recalling data from an archived file on a secondary storage for performing a read operation.
Figure 11:
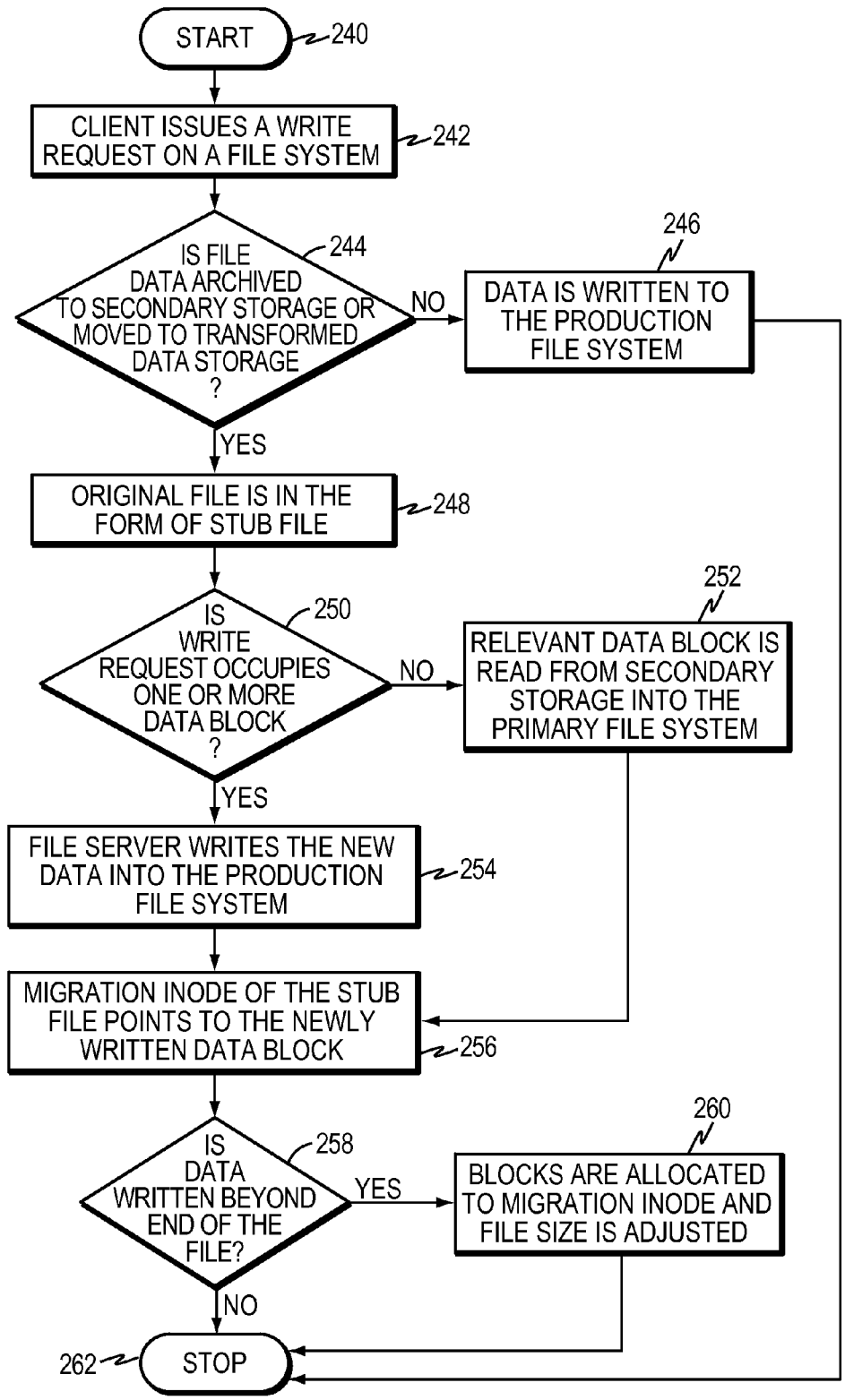
FIG. 11 is a flow logic diagrams illustrating a method of recalling data from an archived file on a secondary storage or transformed file on Transformed data storage for performing a write operation.
Figure 12:
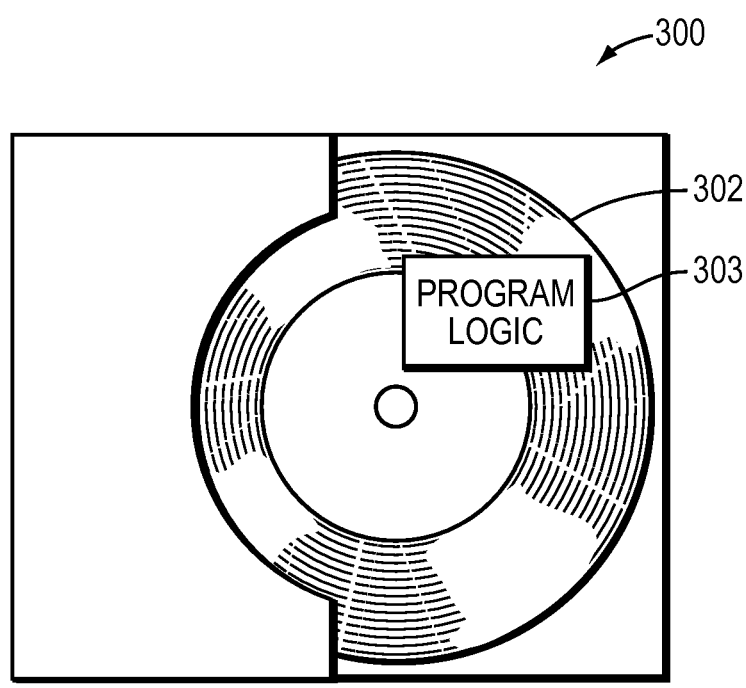
FIG. 12 shows a storage application for carrying out the methodology described herein and a computer medium including software described herein.

Reference will be made below to FIGS. 10-12 to describe a problem solved with the architecture described above with reference to FIGS. 1-9; however, a general overview is now given. The inventors have critically recognized that when reading a file that has been archived to secondary storage could take a along time and would use considerable space on the primary storage as file data is recalled from the start of the file up to the block of data requested by the client. Similarly writing to a file that has been archived to secondary storage or relocated to Transformed data storage could take a long time and consume space on primary storage as before the write operation can proceed, entire content of the file is recalled. This approach further suffers from the problem of high latency.

This problem is addressed with the architecture of the present invention by recalling only the required data block on read operation and recalling and modifying only the required data block on write operation. The present invention thus decreases the storage cost, I/O requirement and at the same time improves the efficiency and latency of the file server in a data network environment.

FIG. 10 shows the process of sparse recall on read operation issued by a client of the file server. The processing starts at step 200 where client issues a read request on a file system in step 202. File server checks in step 204 if the file data has been archived to secondary storage. In case file data is online and has not been archived, data is read from the production file system in step 206 and no recall of file data is required. In case the file data is archived or relocated, original file is converted to a stub file in step 208. File server further checks in step 210 if the data block on which client has issued a read request has been recalled previously. If the data block has been recalled previously, file data is read from the migration Inode of the stub file in step 212. If the data block has not been recalled previously, policy for read request is checked under step 214. The policy of interest in the present invention is partial recall. If partial recall policy for read operation is selected, file server recalls only the portion of data requested by a client to satisfy the read request in step 218. If any policy other than partial recall is selected, data is read based on the other specified policy in step 216. The data requested is returned back to the client and read request completes successfully in step 220.

FIG. 11 shows the process of sparse recall on write operation issued by a client of the file server. The write processing starts at step 240, where client issues a write request on a file system in step 242. File server then checks if the file data has been archived to secondary storage or relocated to Transformed data storage in step 244. If file data has not been archived or relocated, data is written to the user area of the file on a production file system in step 246. If the file data has been archived or relocated, original file is usually converted to a stub file in step 248. File server in step 250 checks if write request occupies one or more blocks. If the new data does not occupy one or more blocks the relevant blocks are read from the secondary storage into the primary file system in step 252 and then modified with the new data and written to the alternate data stream in step 256. When client of the file server writes to a block somewhere in the middle of the file and if new data occupies one or more blocks it is written into the file system in step 254. In step 256, the appropriate block pointer in the migration Inode is updated to point to the new blocks being written by the client. In step 258, file server checks if data is written beyond the current end of the file or appended to the file. If data is written beyond the end of the file, additional blocks are allocated to the migration Inode and the file's size is adjusted accordingly in step 260. Write processing then ends successfully at step 262.

FIG. 12 shows the storage application 300 and Computer-readable medium 302 that includes program logic 303. Such a medium may be represented by any or all of those described at the beginning of this Detailed Description.

What is claimed is:

1. A method comprising:

receiving a request from a client of a storage system to access a data object from a primary storage of the storage system;

determining whether the requested data object is stored in a first form at the primary storage or is stored in a second form at a secondary storage of the storage system;

identifying that the requested data object is stored in the second form at the secondary storage according to a stub file, including attributes of the data object, stored in the primary storage, replacing the data object, and linking to the data object stored in the second form at the secondary storage;

determining which data blocks of the data object requested by the client that are not stored in the primary storage, if any, are stored in the secondary storage and are required in order to satisfy the request according to a migration inode associated with the stub file stored in the primary storage;

recalling the data blocks of the data object, that are determined to be stored in the secondary storage and are required to satisfy the request, from the secondary storage; and returning data, including the data blocks recalled from the secondary storage, to the client to satisfy the request.

2. The method of claim 1, wherein the data object is represented at the primary storage by a file or a logical unit number comprised of one or more data blocks.

3. The method of claim 1, wherein the storage system is represented by a file server configured to present a logical view of a file to the client, wherein at least a portion of the file is stored in the secondary form at the secondary storage.

4. The method of claim 1
wherein the receiving the request from the client of the storage system to access the data object from the primary storage of the storage system comprises receiving a read operation from the client; and
wherein the recalling the data blocks of the data object, that are determined to be stored in the secondary storage and are required to satisfy the request, from the secondary storage comprises recalling the data blocks required to satisfy the read operation.

5. The method of claim 4
wherein the receiving the read operation from the client comprises receiving a specified offset in a data object;
wherein the recalling the data blocks required to satisfy the read operation comprises recalling the data block that includes data for the specified offset in the data object; and
wherein the data object is archived to the secondary storage such that the client of the storage system can no longer access data of the data object directly from the primary storage.

6. The method of claim 4
wherein the receiving a read operation from the client comprises receiving a specified offset in a data object;
wherein the recalling the data blocks required to satisfy the read operation comprises recalling the data block that includes data for the specified offset in the data object; and
wherein the data object is transformed from the primary storage and relocated to the secondary storage such that the client of the storage system can no longer access data of the data object directly from the primary storage.

7. The method of claim 1
wherein the receiving the request from the client of the storage system to access a data object from the primary storage of the storage system comprises receiving a write operation from the client; and
wherein the recalling the data blocks of the data object, that are determined to be stored in the secondary storage and are required to satisfy the request, from the secondary storage comprises:
recalling the data blocks required for the write operation; and
modifying the recalled data blocks according to the write operation.

8. The method of claim 7
wherein the receiving the write operation from the client comprises receiving a specified offset in a data object;
wherein the recalling the data blocks required to satisfy the write operation comprises recalling the data block that includes data for the specified offset in the data object;
wherein the modifying the recalled data blocks according to the write operation comprises modifying the recalled data block that includes the data modified at the specified offset by the write operation in the data object; and
wherein the data object is archived from the primary storage to the secondary storage such that the client of the storage system can no longer access data of the data object directly from the primary storage.

9. The method of claim 7
wherein the receiving the write operation from the client comprises receiving the specified offset in the data object;
wherein the recalling the data blocks required to satisfy the write operation comprises recalling the data block that includes data for the specified offset in the data object;
wherein the modifying the recalled data blocks according to the write operation comprises modifying the data block that includes the data modified at the specified offset by the write operation in the data object; and
wherein the data object is transformed from the primary storage and relocated to the secondary storage such that the client of the storage system can no longer access data of the data object directly from the primary storage.

10. The method of claim 7 further comprising:
receiving the write operation from the client including a specified offset in a data object;
determining whether a first size of data to be written according to the write operation from the client is less than a second size of a data block size of the storage system;
upon determining that the first size of the data to be written according to the write operation from the client is less than the second size of the data block size of the storage system, recalling the data block that includes data for the specified offset in the data object; and
modifying the recalled data block that includes the data modified at the specified offset by the write operation in the data object.

11. A system comprising:
a storage system including a primary storage and a secondary storage; and
a program logic in communication with the storage system for carrying out the steps of:
receiving a request from a client of the storage system to access a data object from the primary storage of the storage system;
determining whether the requested data object is stored in a first form at the primary storage or is stored in a second form at the secondary storage;
identifying that the requested data object is stored in the second form at the secondary storage according to a stub file, including attributes of the data object, stored in the primary storage, replacing the data object, and linking to the data object stored in the second form at the secondary storage;
determining which data blocks of the data object requested by the client that are not stored in the primary storage, if any, are stored in the secondary storage and are required in order to satisfy the request according to a migration inode associated with the stub file stored in the primary storage;
recalling the data blocks of the data object, that are determined to be stored in the secondary storage and are required to satisfy the request, from the secondary storage; and
returning data, including the data blocks recalled from the secondary storage, to the client to satisfy the request.

12. The system of claim 11, wherein the data object is represented at the primary storage by a file or a logical unit number comprised of one or more data blocks.

13. The system of claim 11, wherein the storage system is represented by a file server configured to present a logical view of a file to the client, wherein at least a portion of the file is stored in the secondary form at the secondary storage.

14. The system of claim 11
wherein the receiving the request from the client of the storage system to access the data object from the primary storage of the storage system comprises receiving a read operation from the client; and wherein the recalling the data blocks of the data object, that are determined to be stored in the secondary storage and are required to satisfy the request, from the secondary storage comprises recalling the data blocks required to satisfy the read operation.

15. The system of claim 14
wherein the receiving the read operation from the client comprises receiving a specified offset in the data object;

wherein recalling the data blocks required to satisfy the read operation comprises recalling the data block that includes data for the specified offset in the data object; and wherein the data object is archived to the secondary storage such that the client of the storage system can no longer access data of the data object directly from the primary storage.

16. The system of claim 14
wherein receiving the read operation from the client comprises receiving a specified offset in a data object;

wherein recalling the data blocks required to satisfy the read operation comprises recalling the data block that includes data for the specified offset in the data object; and wherein the data object is transformed from the primary storage and relocated to the secondary storage such that the client of the storage system can no longer access data of the data object directly from the primary storage.

17. The system of claim 11
wherein the receiving the request from the client of the storage system to access the data object from the primary storage of the storage system comprises receiving a write operation from the client; and wherein the recalling the data blocks of the data object, that are determined to be stored in the secondary storage and are required to satisfy the request, from the secondary storage comprises:
  recalling the data blocks required for the write operation; and
  modifying the recalled data blocks according to the write operation.

18. The system of claim 17
wherein receiving the write operation from the client comprises receiving a specified offset in a data object;

wherein the recalling the data blocks required to satisfy the write operation comprises recalling the data block that includes data for the specified offset in the data object;

wherein the modifying the recalled data blocks according to the write operation comprises modifying the recalled data block that includes the data modified at the specified offset by the write operation in the data object; and wherein the data object is archived from the primary storage to the secondary storage such that the client of the storage system can no longer access data of the data object directly from the primary storage.

19. The system of claim 17
wherein the receiving the write operation from the client comprises receiving a specified offset in a data object;

wherein the recalling the data blocks required to satisfy the write operation comprises recalling the data block that includes data for the specified offset in the data object;

wherein the modifying the recalled data blocks according to the write operation comprises modifying the data block that includes the data modified at the specified offset by the write operation in the data object, and wherein the data object is transformed from the primary storage and relocated to the secondary storage such that the client of the storage system can no longer access data of the data object directly from the primary storage.

20. A computer program product including a non-transitory computer readable storage medium having computer program code encoded thereon that, when executed on a processor of a computer, causes the computer to perform the operations of:
  receiving a request from a client of a storage system to access a data object from a primary storage of the storage system;
  determining whether the requested data object is stored in a first form at the primary storage or is stored in a second form at a secondary storage of the storage system;
  identifying that the requested data object is stored in the second form at the secondary storage according to a stub file, including attributes of the data object, stored in the primary storage, replacing the data object, and linking to the data object stored in the second form at the secondary storage;
  determining which data blocks of the data object requested by the client that are not stored in the primary storage, if any, are stored in the secondary storage and are required in order to satisfy the request according to a migration inode associated with the stub file stored in the primary storage;
  recalling the data blocks of the data object, that are determined to be stored in the secondary storage and are required to satisfy the request, from the secondary storage; and
  returning data, including the data blocks recalled from the secondary storage, to the client to satisfy the request.

* * * * *